US 8,335,729 B2

(12) United States Patent
Kulkarni et al.

(10) Patent No.: US 8,335,729 B2
(45) Date of Patent: Dec. 18, 2012

(54) DELIVERY AND PRICING INFORMATION IN EXPOSURE MANAGEMENT

(75) Inventors: Aniket Kulkarni, Bangalore (IN);
Rajesh Balaram, Bangalore (IN);
Vinodh Ar, Chennai (IN)

(73) Assignee: SAP AG, Walldorf (DE)

( * ) Notice: Subject to any disclaimer, the term of this patent is extended or adjusted under 35 U.S.C. 154(b) by 30 days.

(21) Appl. No.: 12/861,533

(22) Filed: Aug. 23, 2010

(65) Prior Publication Data
US 2012/0047048 A1 Feb. 23, 2012

(51) Int. Cl.
*G06Q 10/00* (2012.01)
(52) U.S. Cl. ........... 705/28; 705/36 R; 705/35; 705/400; 705/10
(58) Field of Classification Search .............. 705/28, 705/36 R, 10, 7
See application file for complete search history.

(56) References Cited

U.S. PATENT DOCUMENTS

| 7,318,049 | B2 * | 1/2008 | Iannacci ........................ 705/39 |
| 7,693,778 | B2 * | 4/2010 | Nafeh ............................. 705/37 |
| 7,933,824 | B2 * | 4/2011 | Kongtcheu ................. 705/36 R |
| 8,073,760 | B2 * | 12/2011 | Somech et al. ............ 705/36 R |
| 2002/0128941 | A1 * | 9/2002 | Champion et al. ............ 705/36 |
| 2008/0097884 | A1 * | 4/2008 | Ferris ......................... 705/36 R |
| 2009/0076859 | A1 * | 3/2009 | Phillips ........................... 705/4 |
| 2010/0145767 | A1 * | 6/2010 | Snow et al. ..................... 705/10 |
| 2010/0223200 | A1 * | 9/2010 | Balson et al. .............. 705/36 R |

* cited by examiner

*Primary Examiner* — Vanel Frenel
(74) *Attorney, Agent, or Firm* — Kenyon & Kenyon LLP

(57) ABSTRACT

An exposure management system may include customizable pricing and delivery components interfacing with existing organizational systems and third party systems. The pricing component may enable an organization to enter variable pricing terms, such as customizable pricing formulas that depend on a published price averaged over time. Data used in the pricing formulas and terms may be obtained electronically from various sources. The delivery component may enable the exposure management system to measure risks associated with split or periodic deliveries. The delivery component may also interface with existing systems, such as ERP, CRM, and inventory management systems, to verify that deliveries actually occurred. Methods and devices are provided.

18 Claims, 10 Drawing Sheets

FIG. 1

Raw Exposure ID 101    236
Exposure Activity Type 102    VIMPU    VI City Purchase (New Approach)

Header Data | Line Item Data | User Data

Exposure Line Items

| Item. | Ext Ite | Per | Pla. | Exp. Date | Commodity ID | UoM | | Quantity | Payment Date |
|---|---|---|---|---|---|---|---|---|---|
| Line Item 110 → | | | | FEB 2010 ← Time Frame 111 | VI_METAL_FRA ← Identifier 113 | KG | | 1,000 | 27.02.2010 ← Payment Date 116 |

Sub Exposures

| Item ID | Sub Expos. | Risk Cat | Description | Trans Act | Desc | Commodity ID | Commodity Name | UOM | |
|---|---|---|---|---|---|---|---|---|---|
| 1 | 1 | 2 | Commodity Price Risk | 2 | | VI_METAL_FRA | Vinodh Metal@FRA | KG | 1,0 |

FIG. 2

| Pricing Date | Commodity ID | Weightage | Fixed Price | Exp | Pr Unit Of Quot | UoM |
|---|---|---|---|---|---|---|
| 01.02.2010 | VI_METAL_LME | 20.00000 | 3,000.00 | EUR | 5 | KG |
| 02.02.2010 | VI_METAL_LME | 20.00000 | | | 0 | |
| 03.02.2010 | VI_METAL_LME | 20.00000 | | | 0 | |
| 04.02.2010 | VI_METAL_LME | 20.00000 | | | 0 | |
| 05.02.2010 | VI_METAL_LME | 20.00000 | | | 0 | |

Pricing Date 211 — Identifier 212 — Weightage 213 — Fixed Price 214 — Currency 215 — Units Per Price 216 — Units 217

FIG. 3

Raw Exposure Delivery Maintenance : Display

| Delivery Date | Dly Percent | Delivery Status |
|---|---|---|
| 22.02.2010 | 25.000000 | ☐ |
| 24.02.2010 | 25.000000 | ☐ |
| 25.02.2010 | 50.000000 | ☐ |

← Delivery Date 311

← Percentage 312

← Status 313

FIG. 4

Exposure Positions as of 30.12.2009

| Pos | Period | Plan Yr | Exp. Date | Qty | Dly Qty | Description | Description |
|---|---|---|---|---|---|---|---|
| 383 | FEB | 2010 | 28.02.2010 | 2,000- | 1,000- | 0 | Commodity Price Risk | Forecasted Transacti |
| 384 | FEB | 2010 | 28.02.2010 | 1,000- | 1,000- | 1,000 | Commodity Price Risk | Firm Commitment Tran |

Line Item 401

Line Item 402

Transaction Quantity 410

Net Quantity 420

Delivery Quantity 430

FIG. 5

Exposure Position Flows

Exposure Position Flows - Results

| | Qty | UoM | Dlv Qty | UoM | Payment Date | Period | Plan Yr | Version | Valid Frq | Description | Description |
|---|---|---|---|---|---|---|---|---|---|---|---|
| Line Item 501 | | | 250 | KG | 27.02.2010 | FEB | 2010 | 1 | 30.12.20 | Delivery Leg | Firm Commitment Tran |
| Line Item 502 | | | 500 | KG | 27.02.2010 | FEB | 2010 | 1 | 30.12.20 | Delivery Leg | Firm Commitment Tran |
| Line Item 503 | 1,000- | KG | | | 27.02.2010 | FEB | 2010 | 1 | 30.12.20 | Pricing Leg | Firm Commitment Tran |
| Line Item 504 | | | 250 | KG | 27.02.2010 | FEB | 2010 | 1 | 30.12.20 | Delivery Leg | Firm Commitment Tran |

Pricing Quantity 520

Delivery Quantity 510

FIG. 6

Exposure Position Flows

Exposure Position Flows - Results

| | Qty | UoM | Dlv Qty | UoM | Pymt Date | Period | Plan | Version | | Description | Description |
|---|---|---|---|---|---|---|---|---|---|---|---|
| Line Item 601 → | 0 | KG | 250 | KG | 27.02.2010 | FEB | 2010 | 1 | Price Risk | Delivery Leg | Firm Commitment Tran |
| Line Item 603 → | 0 | KG | 500 | KG | 27.02.2010 | FEB | 2010 | 1 | Price Risk | Delivery Leg | Firm Commitment Tran |
| Line Item 604 → | 0 | KG | | | 27.02.2010 | FEB | 2010 | 2 | Price Risk | Pricing Leg | Firm Commitment Tran |
| Line Item 605 → | 0 | KG | | | 27.02.2010 | FEB | 2010 | 4 | Price Risk | Pricing Leg | Firm Commitment Tran |
| | -1,000 | KG | | | 27.02.2010 | FEB | 2010 | 5 | Price Risk | Pricing Leg | Firm Commitment Tran |
| | | | | | 27.02.2010 | FEB | 2010 | 6 | Price Risk | Pricing Leg | Firm Commitment Tran |
| Line Item 602 → | 0 | KG | 250 | KG | 27.02.2010 | FEB | 2010 | 1 | Price Risk | Delivery Leg | Firm Commitment Tran |
| | | | | | 27.02.2010 | FEB | 2010 | 3 | Price Risk | Pricing Leg | Firm Commitment Tran |

FIG. 7

Exposure Positions as of 30.12.2009

| Pos ID | Qty Approach | Category | Period | Plan Yr | Exp. Date | Qty | Qty | Dly Qty | Description |
|---|---|---|---|---|---|---|---|---|---|
| | Classical (Pricing only) | | FEB | 2010 | 28.02.2010 | 2,000- | 1,000- | 0 | Forecasted Transacti |
| Line Item 701 → | Pricing and Delivery b | | FEB | 2010 | 28.02.2010 | 1,000- | 1,000- | 750 | Firm Commitment Tran |
| Line Item 702 → | Classical (Pricing only) | | FEB | 2010 | 28.02.2010 | 10- | 260- | 0 | Asset/Liability Tran |

Transaction Quantity 710  
Net Quantity 720  
Delivery Quantity 730

FIG. 8

Exposure Positions as of 30.12.2009

| Pos ID | Cty Approach | Category | Period | Plan Yr | Exp. Date | Qty | Qty | Dlv Qty | Description |
|---|---|---|---|---|---|---|---|---|---|
| | Classical (Pricing on) | | FEB | 2010 | 28.02.2010 | 2,000- | 1,000- | 0 | Forecasted Transacti |
| Line Item 801 → | Pricing and Delivery b | | FEB | 2010 | 28.02.2010 | 1,000- | 1,000- | 0 | Firm Commitment Tran |
| Line Item 802 → | Classical (Pricing on) | | FEB | 2010 | 28.02.2010 | 10- | 1,010- | 0 | Asset/Liability Tran |

Transaction Quantity 810

Net Quantity 820

Delivery Quantity 830

DELIVERY AND PRICING INFORMATION IN EXPOSURE MANAGEMENT

BACKGROUND

Exposure management systems and tools provide a framework for aggregating, organizing, and managing risks associated with different business activities. For example, exposure management systems may be used to organize and manage market risks, which may include risks that the value of an investment or trading portfolio will decrease due to changes in various factors, such as stock prices, interest rates, foreign exchange rates, and commodity prices.

While existing exposure management systems may be capable of aggregating certain types of organizational information to organize and manage market risks associated with business activities conducted by an organization, these capabilities may be limited. For example, existing exposure management systems may only be capable of organizing and managing basic and limited risks. Organizations engaged in sophisticated trading activities, such as commodity trading companies, need to seamlessly integrate organizational trading activity data from different sources into a single exposure management system but are unable to do because existing exposure management systems are incapable of processing complex pricing and delivery terms negotiated by commodity trading companies.

There is a need for an exposure management system that is capable seamlessly integrating and managing risks associated with complex contracts, including contracts for goods or services where delivery does not coincide with payment, delivery is split into several partial deliveries, and/or pricing varies based on particular formulas.

BRIEF DESCRIPTION OF THE DRAWINGS

FIG. 1 shows an exemplary interface for interacting with exposure data in an embodiment.

FIG. 2 shows exemplary pricing component functionality in an embodiment.

FIG. 3 shows an exemplary delivery component functionality in an embodiment.

FIG. 4 shows an exemplary change in exposure positions after contract data is released to the exposure management system.

FIG. 5 shows an exemplary change in exposure positions after pricing and delivery component information is received at the exposure management system.

FIG. 6 shows exemplary changes in exposure positions after pricing information is updated.

FIG. 7 shows exemplary changes in exposure positions after completion of the first partial delivery.

FIG. 8 shows exemplary changes in exposure positions after completion of the second and third partial deliveries.

DETAILED DESCRIPTION

Figure 9:
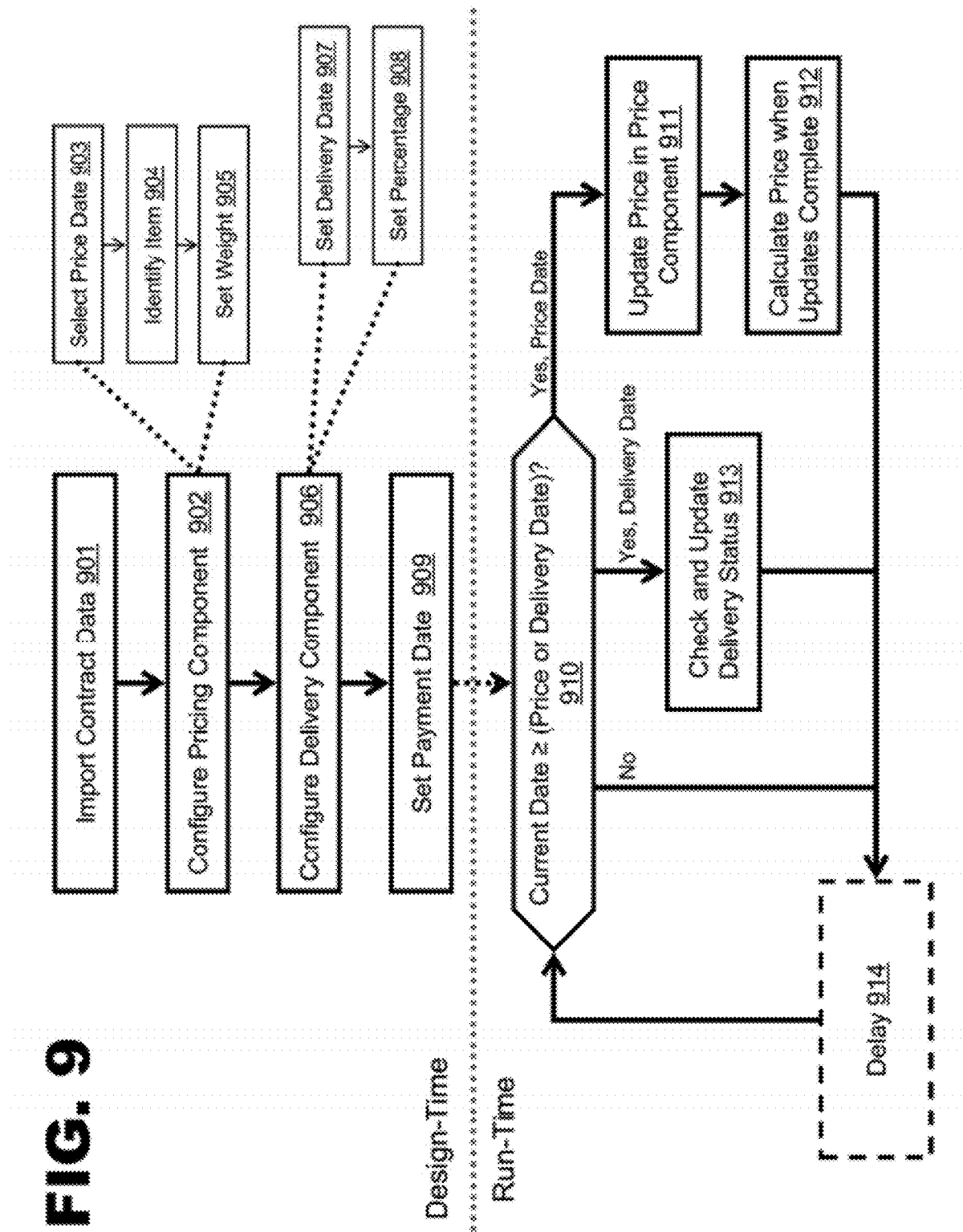
FIG. 9 show an exemplary process for designing and executing at run-time expanded delivery and pricing functionality in an embodiment.

In an embodiment of the invention, an exposure management system may include functionality for managing risks associated with contracts for goods/services. These risks may include pricing and delivery risks, which may be managed through customizable pricing and delivery components interfacing with existing organizational systems, such as enterprise resource planning (ERP) or customer relationship management (CRM) systems.

The pricing component may enable an organization to enter variable pricing terms, such as customizable pricing formulas that depend on a published price averaged over time. Data used in the pricing formulas and terms may be obtained electronically from third parties through a communications network automatically. Alternatively, pricing data may be obtained from other sources and media.

The delivery component may enable the exposure management system to measure risks associated with split or periodic deliveries. For example, an annual contract may involve weekly or monthly deliveries of certain products. The delivery component may enable the organization automatically to manage risks associated with customized delivery schedules. The delivery component may also interface with existing systems, such as ERP, CRM, and inventory management systems, to verify that deliveries actually occurred and/or reschedule missed deliveries.

FIG. 1 shows an exemplary interface for interacting with exposure data in an embodiment. Exposure ID field 101 may include a unique identifier for an exposure activity. An exposure activity field 102 may identify the type of business activity generate a risk for the organization. Types of business activities may include: contracts for the purchase and/or sale of goods, such as commodities; currency exchanges; financial investment activities; and other risk generating activities. Line items 110 may include additional details concerning the specific activity identified in fields 101 and 102. For example, for contracts governing the exchange of goods, such as commodities, the line item fields 110 may include a time frame field 111, product identifier field 113, and payment date field 116. Data for these fields may be extracted and/or calculated from existing enterprise systems, such as CRM, ERP, and inventory management systems. The exposure management system may include hardware and/or software functionality to interact with these existing systems and retrieve specific data. For example, the exposure management system may extract product, payment, and date information from one or more databases storing purchase order information in the existing enterprise systems. After extracting the data, the exposure management system may reorganize, aggregate, and represent the data in a format suitable for risk management purposes. Alternatively, the exposure management system may extract the information from existing database storing contract terms, or the existing systems may be modified to transmit new product, payment, and date information synchronously or asynchronously to the exposure management system.

Once the data is accessible to the exposure management system, the system may restructure the data into one or more line items 110. In the example shown in FIG. 1, data from an agreement to purchase of 1,000 Kg of metal may be imported into the exposure management system. This data, shown in line item 110, may have been obtained from purchase order data, contract data, or other data stored in existing ERP, CRM, inventory management, or other systems of the organization. The data in line item 110 may also represent data in one contract or it may represent an aggregation of data in multiple contracts.

Line item 110 may encompass the purchase 102 of 1000 Kg of a metal specified in the commodity identifier field 113 during the February 2010 time frame 111. Line item 110 may also include a payment data field 116. The payment date field 116 may be automatically extrapolated depending on extracted contract terms. For example, if the contract terms specify that payment is due within 30 days after delivery, the exposure management system may add thirty days to the delivery date and enter the calculated payment date into the field 116. Thus, the payment date may be automatically calculated from other information in the exposure management system and/or existing systems of the organization.

FIG. 2 shows exemplary pricing component functionality in an embodiment. As discussed previously, the pricing component may enable entry of a mutli-variable pricing formula. In the example shown in FIG. 2, the contract price of the 1000 Kg of metal to be purchased, as shown in FIG. 1, may be based on an average price of the metal on the London Metal Exchange over five days between Feb. 1, 2010 and Feb. 5, 2010.

The pricing date field 211 may include a past, current, or future date that price is to be determined. In the example shown in FIG. 2, the contracted price of the metal is based on the average price on the London Exchange over a five day window, so there are five different pricing dates (February 1 to 5) listed. Other embodiments may have different pricing dates depending on how the price is to be calculated.

The commodity identifier field 212 may include an identifier of a commodity, good, or service for pricing purposes. The exposure management system may be able to identify a data source from which pricing information may be extracted based on data in the identifier field. For example, the commodity ID "VI_METAL_LME" may be associated with or linked to a specific metal listed on the London Metal Exchange. The exposure management system may then interface with the data source for pricing information, in this case a computing system with pricing information for metals on the London Metal Exchange, through the link to retrieve the desired pricing information. Thus, when pricing information may be calculated based on third party information, such as the price of a commodity at an exchange, an exchange rate posted in a newspaper, or an interest rate set by a government, the exposure management system may be configured to automatically obtain the pricing information from a third party source within or outside the organization, such as a database, website, or other source.

The weightage field 213 may be used to calculated weighted averages of fields. In the example shown in FIG. 2, the price of the metal is based on a simple average, so each price is assigned an equal weight of 20%. If, however, the contracted price of the metal was based on a weighted average, with the price on Feb. 1, 2010, counted six times as much as the pricing on the remaining four days (February 2 to 5), then the weightage field 213 may be set to 60.0 for pricing date February 1 and 10.0 for each of pricing dates February 2 to 5.

The fixed price field 214 may be used to store a price valid on the pricing date that was obtained from an external source. Thus, for the example shown in FIG. 2 corresponding to a contract price based on the average price of a metal on the London Metal Exchange between February 1 to 5, the actual prices of the metal as listed on the exchange for those five days may be received at the exposure management system and included in the fixed price field 214 for each of the days.

The exposure currency field 215 may include a currency unit for which the fixed price in fixed price field 214 is based. Thus, for the example shown in FIG. 2, if the price for the metal at the external source, in this case the London Metal Exchange is quoted in Euros, the exposure currency field 215 may be in Euros. If the price is in pounds sterling, then the exposure currency field 215 may be in Pounds. In some embodiments, the exposure management system may convert currencies depending on the terms of the contract and the fixed price 214 and currency 215 fields may contain the results of the currency conversion. The currency unit 215 may be obtained from the external source supplying the fixed price information 214, or the currency unit 215 may be obtained from another source, such as from a lookup table linked to one or more fields, including the commodity ID 212.

The quotation unit 216 and measurement unit 217 fields may include data identify quantity of units of items at the fixed price 214. For example, if the price of the metal associated with the identifier 212 "VI_METAL_LME" listed on the exchange is $3,000 per 5 kilograms, the fixed price 214 may be 3,000, the measurement unit 217 may be kilograms, and the quotation unit 216 may be 5. The quotation unit 217 and measurement unit 217 may be obtained from the external source supplying the fixed price information 214, or the quotation and measurement units 216 and 217 may be obtained from another source, such as from a lookup table linked to one or more fields, including the commodity ID 212. In some embodiments, the exposure management system may convert quotation and measurement units 216 and 217 between different measurement units and system, such as from the Metric System to the English System, or within the same system, such as from inches to yards or milliliters to liters, depending on the configuration of the system.

FIG. 3 shows an exemplary delivery component functionality in an embodiment. As discussed previously, the delivery component may enable splitting the delivery of a product or performance of a service into multiple portions. In the example shown in FIG. 3, the delivery of a quantity of metal may be split into three separate deliveries, with the first quarter of the metal delivered on Feb. 22, 2010, the second quarter delivered on February 24, and the last half delivered on February 25. The delivery date field 311 may include the date that each delivery is to occur. The delivery date field 311 may also include the date that performance of a portion of the contract is to be completed. Data included in the delivery date field 311 may be obtained in some instances from the existing CRM, ERP, inventory management, or other systems of the organization. The data may also be obtained from other sources. For example, delivery dates 311 may be obtained from purchase order data or from contact data containing the terms of particular contracts.

The delivery percent field 312 may include data representing the portion of contract that is to be performed by or on the delivery date 311. In the case of a commodity contract, the delivery percent field 312 may represent the percentage of the commodity that is to be delivered on the delivery date 311. Data included in the delivery percent field 312 may be obtained in some instances from the existing CRM, ERP, inventory management, or other systems of the organization. The data may also be obtained from other sources. For example, delivery percentages 312 may be obtained from purchase order data or from contact data containing the terms of particular contracts.

Delivery status field 313 may include an identifier to indicate whether the delivery was completed or not. When, for example, the percentage indicated in the percent field 312 is actually delivered on the delivery date 311, the status field 313 may be set to indicate that the delivery has been completed. Otherwise, the status field 313 may indicate that the delivery is incomplete. Risk and other calculations performed by the exposed management system may vary depending on whether performance of a contract has been completed. Data updates to the delivery status field 313 may be obtained in some instances from the existing CRM, ERP, inventory management, or other systems of the organization. Once these other systems have determined that the delivery has been completed, the information may be communicated to the exposure management system and the status field 313 may be update accordingly. The data may also be obtained from other sources. For example, delivery status field 313 may be obtained from a shipment tracking system, which may be maintained by a third party responsible for actual delivery.

The exposure management system may also include an additional indicator, such as an inventory indicator, which may specify whether the inventory values provided represent a delta value or a full inventory value. The delta value may represent an amount of change in the inventory level since the last update. The full inventory value may represent the total quantity remaining in inventory. If the inventory indicator is set to full inventory value, then the full inventory value may be periodically stored in an asset/liability exposure position. A flag may be set to store an inventory balance periodically, such as at the end of a day, to synchronize logistics and exposure management systems. Synchronization may be used to account for other inventory variances, such as losses due to theft. In some situations, if a large inventory variance occurs, because of, for example, an extraordinary circumstance, the inventory indicator may be switched to perform a more immediate synchronization instead of waiting for the next scheduled periodic synchronization.

FIG. 4 shows an exemplary change in exposure positions after contract data is released to the exposure management system. The contract data that is released in FIG. 4 may include a forecasted sale of 2000 units of metal in February 2010 in line item 401, and a firm commitment of 1000 units of the forecasted 2000 units of metal in line 402. Because the released data includes a forecasted sale of 2000 units and a firm commitment of 1000 units, the transaction quantity field 410 in line item 401 may be 2000, whereas the transaction quantity field 410 in line item 402 may be 1000. Since there is a firm commitment for 1000 out of the 2000 units forecasted to be sold in the February 2010 time period (as shown in the period and plan year fields), the net quantity field 420 in line item 401 may be 1000 units. The net quantity field 420 for line item 402 may also be 1000 units. The delivery quantity field 430 for line item 401 may be 0 because the line item 401 only reflects forecasted, not actual, sales. The delivery quantity field in line item 402 may be 1000 since there are still 1000 units remaining to be delivered.

FIG. 5 shows an exemplary change in exposure positions after pricing and delivery component information is received at the exposure management system. Line items 501, 502 and 504 may correspond to delivery component information similar to that shown in FIG. 3. Line item 503 may correspond to pricing component information similar to that shown in FIG. 2. If the firm commitment amount of 1000 units in line item 402 of FIG. 4 is also considered, line items 501 and 504 in FIG. 5 may correspond to the first two deliveries of 250 units each as shown in the delivery quantity field 510 (corresponding to the 25.0 delivery percent shown in FIG. 3) on February 22 and 24 as indicated in FIG. 3, while line item 502 may corresponding to the third delivery of 500 units as shown in the delivery quantity field 510 (corresponding to the 50.0 delivery percent shown in FIG. 3) on February 25 as indicated in FIG. 3. Line item 503 may correspond to price information entered as shown in FIG. 2.

FIG. 6 shows exemplary changes in exposure positions after pricing information entered in FIG. 2 is updated. As discussed previously, pricing information may be extracted from and imported into the exposure management system from other systems. In the example shown in FIG. 2, the contract price for a quantity of metal may be based on the average price of the metal on the London Metal Exchange over a five day period from February 1 to 5. Once the February 1 price of the metal has been determined and imported into the exposure management system, such as after the close of the exchange on February 1, line item 601 may be created to reflect the receipt of the updated pricing information to be used in the pricing component. The version field 610 may also be updated for line item 601 to show that this is the second update to the pricing component.

Line items 602 to 605 may also be created once the price of the metal on the four remaining days (February 2 to 5) has been determined and imported to the exposure management system. The version field 610 in each of these line items 602 to 605 may also be updated to reflect additional updates to the pricing component.

FIG. 7 shows exemplary changes in exposure positions after completion of the first partial delivery of 250 units (25%) of the metal on Feb. 22, 2010, as shown in FIG. 3. Once the first delivery of 250 units of the metal in the previous examples has been acknowledged in the exposure management system as successfully completed, the exposure management system may create or modify line item 701 to reflect the successful delivery of the first 250 units. In this example, the delivery quantity field 730 may be updated from 1000 units to 750 units to indicate that 250 of the units have been delivered and 750 units are awaiting delivery. Line item 702, which may report asset/liability information, may be updated to reflect the successful delivery of the 250 units. For example, the net quantity field 720 in line item 702 may be updated to 260 units to reflect the 250 delivered units added to the existing 10 units previous included in the asset/liability information in transaction quantity field 710.

FIG. 8 shows exemplary changes in exposure positions after completion of the second and third partial deliveries of 250 units (25%) and then 500 units (50%) of the metal on February 24 and 25, as shown in FIG. 3. Once the second and third deliveries of 250 units and 500 units respectively of the metal in the previous examples has been acknowledged in the exposure management system as successfully completed, the exposure management system may create or modify line item 801 to reflect the successful delivery of the remaining 750 units. In this example, the delivery quantity field 830 may be updated from 750 units in FIG. 7 to 0 units to indicate that remaining 750 units have been delivered and no more units are awaiting delivery. Line item 802, which may report asset/liability information, may be updated to reflect the successful delivery of the additional 750 units. For example, the net quantity field 820 in line item 802 may be updated to 1010 units to reflect the 250 delivered units in FIG. 7 and the additional 750 delivered units in FIG. 8, both of which may be added to the existing 10 units previous included in the asset/liability information in transaction quantity field 810.

FIG. 9 show an exemplary process for designing and executing at run-time expanded delivery and pricing functionality in an embodiment. Boxes 901 to 909 may be directed to design-time functionality, while boxes 910 to 914 may be directed to run-time functionality.

In box 901, contract data may be imported into an exposure management system. The data may be imported by manual user entry or by automated processing from existing internal systems of the organization. For example, if certain contract data may be obtained from a purchase order, the exposure management system may interface with an organization system storing or processing purchase order data to import certain data from a purchase order in those systems. The data may be imported through push or pull technologies, and the transfer of data between the systems may be initiated by either system. In different embodiments, contract data, which may include a contract identifier and one or more contract terms, may be stored in other systems, such as a contract management system or as part of other systems of the organization, such as CRM or ERP systems.

In box 902, the pricing component may be configured based on the imported contract data. If the contract involved an exchange (such as a purchase or sale) of goods or services where the price of the goods/services to be exchanged is based on a multi-variable formula, then the process may loop through boxes 903, 904, and/or 905 until pricing information for each of the variables is included in the pricing component.

If the multi-variable pricing formula is based on, for example, a price, exchange rate, or other value determined on a particular date, then in box 903, the particular pricing date may be included in the pricing component. The pricing date in box 903 may be a release date, publication date, update date, or other date related to a determination of a price.

In box 904, the item who price is to be included in the pricing formula on the pricing date in box 903 may be included in the pricing component. The item may be the good to be exchanged, an ingredient included in the good, a currency, an intangible asset, or other factor whose value is to be assessed on the pricing date in box 903.

In box 905, the relative weight of the price assessment of the item in box 904 on the date in box 903 may be included in the pricing component. The relative weight may vary among different items in the pricing formula. The final price of the goods or services in the contract may be based principally on the assessed price of a primary material with the secondary materials accounting for only slight price variations in the final price. In this situation, for example, the price of the primary material may be assigned a much larger weight than the price of the secondary materials.

In box 906, the delivery component may be configured based on the imported contract data. If the contract involved an exchange (such as a purchase or sale) of goods or services that are to be delivered or performed in part over time, the process may loop through boxes 907 and/or 908 until delivery information for each part of the contract is included in the delivery component.

In box 907, a delivery date (for goods) or performance completion date (for services), may be included in the delivery component for one or more portions of the goods or services to be delivered or performed. In box 908, a percentage of the goods to be delivered or services to be performed on the date entered in box 907 may be included in the delivery component.

In box 909, a payment date may be set in the exposure management system based on the terms of the contract and the policies of the organization. For example, if a policy of the organization is that payment is due within 30 days of delivery, the payment date may automatically be set to thirty days after delivery according to the dates specified in delivery component 906. If the delivery dates in delivery component 906 change, the payment date in box 909 may be automatically updated to reflect the change.

Sometime after the contract data has been imported and the pricing and delivery components have been configured, the exposure management system may automatically update exposure positions based on changed circumstances. For example, in box 910, the exposure management system may check whether the current date is greater than or equal to either a pricing date in the pricing component with unupdated pricing or a delivery date in the delivery component with an unupdated delivery status.

If the current date is greater than or equal to a pricing date with unupdated pricing, then in box 911, the exposure management system may obtain pricing information from another system for the items and include the pricing information in the exposure management system. Once all of the pricing information associated with a particular contract has been obtained, in box 912, a final price may be calculated by applying the obtained pricing information to the pricing formula specified in the pricing component. Sometime thereafter the process may return to box 910 to repeat the process by checking whether the current date is greater than or equal to an unupdated pricing or delivery date. In some instances, there may be customizable delay 914 before the process returns to box 910. For instance, a delay may be set so that the process only occurs once a day, once per week, or at the request of another system or process.

If the current date is greater than or equal to a delivery date with an unupdated delivery status, then in box 913, the exposure management system may obtain an updated delivery status from another system for the items that were supposed to be delivered. The other system may be an internal system of the organization storing delivery information, such as a CRM, ERP, or inventory management system, or a third party external system, such as a package tracking system maintained by a shipping provider. Sometime after the delivery status has been updated, the process may return to box 910 to repeat the process by checking whether the current date is greater than or equal to an unupdated pricing or delivery date. In some instances, there may be customizable delay 914 before the process returns to box 910. For instance, a delay may be set so that the process only occurs once a day, once per week, or at the request of another system or process.

If the current date is not greater than or equal to a pricing date with unupdated pricing or delivery date with an unupdated delivery status, the process may return to box 910 to repeat the process by subsequently checking whether the current date is greater than or equal to an unupdated pricing or delivery date. In some instances, there may be customizable delay 914 before the process returns to box 910. For instance, a delay may be set so that the process only occurs once a day, once per week, or at the request of another system or process.

Figure 10:
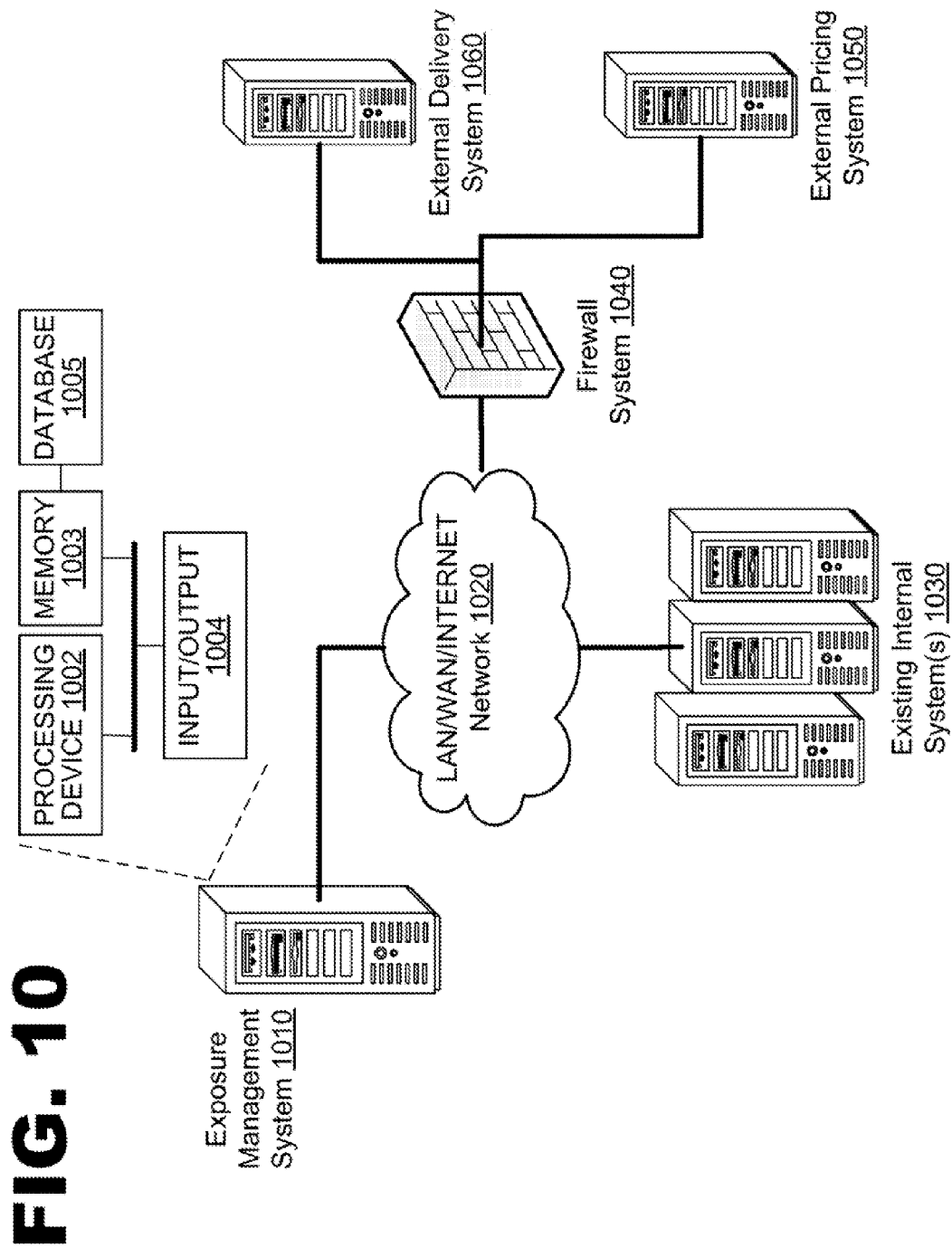
FIG. 10 shows an embodiment of an exposure management system coupled to existing internal systems and to external delivery and pricing systems.

FIG. 10 shows an embodiment of an exposure management system 1010 coupled to existing internal systems 1030 through a network 1020 and to external delivery 1060 and pricing 1050 systems through the network 1020 and firewall system 1040. The existing internal systems 1030 may include one or more of CRM, ERP, inventory management, contract management, and other systems of an organization. The external delivery system 1060 may be maintained by a third party, such as a shipping provider, and may contain tracking and delivery status information for goods that may be purchased or sold. The external pricing system 1050 may also be maintained by a third party, such as an newspaper, information service provider, or exchange, and may contain pricing information for various commodities, services, currencies, or intangible assets, that may be updated by the third party on a periodic basis. The exposure management system 1010 may interact with these external systems to obtain pricing and delivery updates through a firewall system 1040 separating the internal systems of the organization from the external systems.

Each of the systems in FIG. 10 may contain a processing device 1002, memory 1003 containing a database 1005, and an input/output interface 1004, all of which may be interconnected via a system bus. In various embodiments, each of the systems 1010, 1030, 1040, 1050, and 1060 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 1003 may contain different components for retrieving, presenting, changing, and saving data. Memory 1003 may include a variety of memory devices, for example, Dynamic Random Access Memory (DRAM), Static RAM (SRAM), flash memory, cache memory, and other memory devices. Additionally, for example, memory 1003 and processing device(s) 1002 may be distributed across several different computers that collectively comprise a system.

Processing device 1002 may perform computation and control functions of a system and comprises a suitable central processing unit (CPU). Processing device 1002 may comprise a single integrated circuit, such as a microprocessing device, or may comprise any suitable number of integrated circuit devices and/or circuit boards working in cooperation to accomplish the functions of a processing device. Processing device 1002 may execute computer programs, such as object-oriented computer programs, within memory 1003.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method comprising:
   importing contract terms into an exposure management system through a processing device, the contract terms identifying a commodity, a quantity of the commodity for purchasing, a source of a price of the commodity, and a plurality of dates on which the price of the commodity is determined from the source;
   configuring a multi-variable pricing equation to calculate a final price governing the imported contract terms, the pricing equation including a fixed price field storing a price valid on each of the plurality dates for the commodity obtained from the source, a weightage field storing weighted averages of each of the prices stored in the fixed price field, an exposure currency field including a currency unit for each of the prices stored in the fixed price field, a quotation unit field storing a numeric quantity of the commodity for the price valid on each of the dates obtained from the source, a measurement unit field storing a unit of measurement of each numeric quantity in the quotation unit field;
   on each of the plurality of dates, obtaining from the source a price valid on a respective date, a currency of the obtained price, a numeric quantity of the commodity associated with the obtained price, and a unit of measurement of the numeric quantity;
   storing each obtained price in the fixed price field, each obtained currency in the exposure currency field, each obtained numeric quantity in the quotation unit field, and each obtained unit of measurement in the measurement unit field;
   calculating through the processing device the final price from the pricing equation, the quantity of the commodity for purchase, and the data stored in the fixed price field, the weightage field, the exposure currency field, the quotation unit field, the measurement unit field; and
   updating an exposure position in the exposure management system.

2. The computer-implemented method of claim 1, wherein the exposure position in the exposure management system is updated after each price of each item is stored.

3. The computer-implemented method of claim 1, wherein the source is an external pricing system including data from a commodity exchange.

4. The computer-implemented method of claim 3, wherein the price obtained from the external pricing system is sent to exposure management system through a push service.

5. The computer-implemented method of claim 3, wherein the price obtained from the external pricing system is pulled from the external pricing system through a pull service.

6. The computer-implemented method of claim 3, wherein the imported contract terms include an identifier of an item to be sold, the identifier used in part to identify a specific external pricing system to obtain the price from.

7. The computer-implemented method of claim 6, further comprising identifying the specific external pricing system from a lookup table associating the identifier with the specific external pricing system.

8. The computer-implemented method of claim 1, wherein the exposure position in the exposure management system is updated after the final price is calculated.

9. The computer-implemented method of claim 1, further comprising:
   setting a plurality of delivery dates and delivery percentages from the imported contract terms, each delivery percentage corresponding to a percentage of the contract to be delivered by each delivery date;
   storing in the exposure management system a delivery status for each delivery date on or after the delivery date, the delivery status indicating whether the delivery percentage for that delivery date was successfully delivered; and
   updating an exposure position in the exposure management system when the delivery status indicates successful delivery.

10. The computer-implemented method of claim 9, wherein each delivery status is obtained from an external delivery system.

11. The computer-implemented method of claim 10, wherein the imported contract terms include an identifier of an item to be sold, the identifier used in part to identify a specific external delivery system of a delivery service shipping the item.

12. The computer-implemented method of claim 9, wherein each delivery status obtained from an inventory management system.

13. The computer-implemented method of claim 12, wherein each delivery status is pushed from the inventory management system to the exposure management system once successful delivery is indicated in the inventory management system.

14. The computer-implemented method of claim 9, wherein delivery in a contract for services includes performance of the services.

15. The computer-implemented method of claim 9, wherein delivery in a contract for goods includes physical delivery of the goods.

16. The computer-implemented method of claim 9, further comprising activating an inventory indicator to account for lost, stolen, or missing items and updating the exposure position accordingly.

17. A device comprising a computer-readable storage medium including instructions, that when executed by a processor, cause the processor to:

import contract terms into an exposure management system, the contract terms identifying a commodity, a quantity of the commodity for purchasing, a source of a price of the commodity, and a plurality of dates on which the price of the commodity is determined from the source;

configure a multi-variable pricing equation to calculate a final price governing the import contract terms, the pricing equation including a fixed price field storing a price valid on each of the plurality dates for the commodity obtained from the source, a weightage field storing weighted averages of each of the prices stored in the fixed price field, an exposure currency field including a currency unit for each of the prices stored in the fixed price field, a quotation unit field storing a numeric quantity of the commodity for the price valid on each of the dates obtained from the source, a measurement unit field storing a unit of measurement of each numeric quantity in the quotation unit field;

on each of the plurality of dates, obtain from the source a price valid on a respective date, a currency of the obtained price, a numeric quantity of the commodity associated with the obtained price, and a unit of measurement of the numeric quantity;

store each obtained price in the fixed price field, each obtained currency in the exposure currency field, each obtained numeric quantity in the quotation unit field, and each obtained unit of measurement in the measurement unit field;

calculate through the processing device the final price from the pricing equation, the quantity of the commodity for purchase, and the data stored in the fixed price field, the weightage field, the exposure currency field, the quotation unit field, the measurement unit field; and update an exposure position in the exposure management system.

18. The device of claim 17, further comprising additional instructions, that when executed by a processor, cause the processor to:

set a plurality of delivery dates and delivery percentages from the imported contract terms, each delivery percentage corresponding to a percentage of the contract terms to be delivered by each delivery date;

store in the exposure management system a delivery status for each delivery date on or after the delivery date, the delivery status indicating whether the delivery percentage for that delivery date was successfully delivered; and update an exposure position in the exposure management system when the delivery status indicates successful delivery.

\* \* \* \* \*